Patented Oct. 21, 1924.

1,512,733

UNITED STATES PATENT OFFICE.

ERNEST W. WESCOTT, OF NIAGARA FALLS, NEW YORK, ASSIGNOR, BY MESNE ASSIGNMENTS, TO METALLURGICAL DEVELOPMENT CORPORATION, OF BOSTON, MASSACHUSETTS, A CORPORATION OF MASSACHUSETTS.

PROCESS OF UTILIZING ARSENIOUS BY-PRODUCTS.

No Drawing.    Application filed March 18, 1921.   Serial No. 453,470.

*To all whom it may concern:*

Be it known that I, ERNEST W. WESCOTT, a citizen of the United States, residing at Niagara Falls, in the county of Niagara and State of New York, have invented certain new and useful Improvements in Processes of Utilizing Arsenious By-Products, of which the following is a specification.

This invention relates to processes of utilizing arsenious by-products; and it comprises a method of utilizing material containing arsenious chlorid produced in the beneficiation of arsenid ores and speisses by chlorin, wherein such arsenious chlorid is treated with a limited quantity of water to produce insoluble precipitated $As_2O_3$, and a mother liquor containing residual arsenic, this mother liquor then being treated to recover this arsenic as by chlorinating to produce arsenic acid therein, and then neutralizing with suitable bases to produce an arsenate; all as more fully hereinafter set forth and as claimed.

I have elsewhere described and claimed, Serial No. 349,578, a process of beneficiating certain cobalt ores containing large amounts of arsenic, such as those from Cobalt, Canada, as well as analogous ores and speisses wherein the material is exposed to the action of chlorin at a high temperature. With rich ores and speisses, the high temperature maintains itself because of the great evolution of heat in the chemical reactions incident to chlorination. With poorer materials, some outside heat may be necessary and may be supplied. For practical reasons, it is usual to employ the chlorin in some excess. Under these circumstances, the metals forming non-volatile chlorids remain in the solid residue left on chlorination, while the arsenic (and sulfur, if present) goes off as a volatile chlorid which may be condensed and recovered. More or less of such iron as may be contained in the ore goes forward as ferric chlorid which is volatile at a high temperature. On suitably cooling the effluent mixture of gases and vapors, the ferric chlorid is first deposited, and then arsenious chlorid, together with sulfur chlorid, if present. The waste gases coming from the condensers are usually scrubbed to remove traces of uncondensed arsenious chlorid. Where an excess of chlorin is used in chlorination this goes forward with the waste gases and is removed in the scrubber. More or less may remain in solution in the condensed arsenious chlorid. As will be noted, in this method of treating ores arsenious chlorid in a more or less pure state is a substantial by-product.

The present invention is a method of utilizing this arsenious chlorid for the production of other commercial arseniferous products.

As I have found, if the liquid arsenious chlorid be agitated with a relatively small amount of water, the main part of the arsenic present deposits as $As_2O_3$, or "white arsenic." Usually I employ from 2 to 8 parts by weight of water for each part by weight of $AsCl_3$. Good results are obtained by using 340 parts of water for 100 parts of $AsCl_3$. The two liquids are mixed together by stirring under cooling conditions. The reaction of the arsenious chlorid on the water evolves heat and the mixture should be thoroughly cooled to ensure a maximum precipitation of $As_2O_3$. Usually between 80 and 90 per cent of the total arsenic can be thus precipitated; the variation in yield being dependent upon the purity of the arsenious chlorid, the exact ratio of arsenious chlorid and water, the temperature of precipitation, etc. In seeking a maximum recovery of arsenic as white arsenic ($As_2O_3$), it is advisable to use about the proportion of water stated as this gives a solution of HCl of a strength (15 to 20 per cent) in which $As_2O_3$ is relatively little soluble. After cooling the precipitated arsenic is allowed to settle and is separated from the mother liquor by suitable filtration means. A porous stoneware filter bed is applicable. The filtered mother liquor is substantially a solution of HCl and unprecipitated arsenic.

Certain arsenic ores, such as arsenopyrite and certain cobalt and silver ores, contain in addition to arsenic varying amounts of sulfur, and the condensed arsenious chlorid obtained from such ores, or from sulfur-containing metallurgical products of the nature of speisses or mixed matte-speisses, contains sulfur chlorid. And I have found that in the present process, where the arsenious chlorid contains only a small amount of sulfur and is treated as described with a limited amount of water, sulfur chlorid physically separates as such, the water available going first for hydrolysis of arsenious chlorid and formation of white arsenic. On adding such a mixture of arsenious and sulfur chlorids to a limited amount of cold water with vigorous stirring, the arsenious chlorid hydrolyzes substantially to the maximum extent before much of the sulfur chlorid is affected. The unhydrolyzed sulfur chlorid with some dissolved sulfur and arsenic chlorid remains as a liquid which may be separated from the aqueous mixture physically. For example, in performing the hydrolysis in practical operation, I mix the sulfur-containing arsenious chlorid with a limited amount of cold water in a tank, (which may be of wood) having a coned bottom, cooling the mixture with cooling pipes or by the direct addition of ice. Vigorous stirring is resorted to. Upon cessation of stirring, the unhydrolyzed liquid sulfur chlorid being a relatively heavy liquid, collects at the bottom of the tank whence it may be drawn off through a gated bottom discharge. The aqueous liquid, together with the suspended white arsenic, may be drawn off later through another gated discharge pipe which is best located somewhat above the discharge pipe for sulfur chlorid.

In so separating sulfur chlorid, if the arsenious chlorid does not contain free chlorin it is often advantageous to add some in order to prevent deposition of free sulfur from the small portion of sulfur chlorid which goes into aqueous solution under the conditions, as this would contaminate the white arsenic produced.

When present in the arsenious chlorid sulfur chlorid can be separated from the arsenious chlorid in various ways. Separation by ordinary fractional distillation though possible is inconvenient for a number of reasons. If it is desired to remove the sulfur chlorid by distillation it is more advantageous to hold the mixed liquid at 50° to 80° in a suitable still and introduce a little chlorin. Chlorin may be blown through the liquor. Under these conditions, sulfur chlorid distils over without much accompanying arsenic; perhaps because of a temporary or transitory formation of volatile $SCl_2$. Dilute chlorin-containing gases serve excellently well for this purpose, since the inert gas contained aids in the volatilization of the sulfur. The waste gas, which usually contains chlorin, from the chloridizing apparatus itself may be so used to remove sulfur from condensed arsenious chlorid. For example, condensed arsenious chlorid from the condensers may be warmed to from 50° to 80° C and treated with a portion or all of the gases coming directly from the furnace, or from the condensers. In purifying arsenious chlorid from sulfur chlorid in this way it is, of course, advantageous to use a proper rectifying still head.

Another and more economical process of freeing arsenious chlorid from sulfur is to heat the arsenious chlorid under a reflux condenser with addition of a small portion of white arsenic; which may be some of that coming from a later stage in the process. In so doing, the sulfur chlorid is broken up at the expense of the $As_2O_3$. Part of the sulfur passes off as $SO_2$ and part remains as elemental sulfur. The reflux condenser returns any volatilized $AsCl_3$, allowing the $SO_2$ to pass forward. The free sulfur formed in the action can be separated by distillation or partially by decantation or filtering. This process is simple and economical in operation and yields a very pure arsenious chlorid adapted to yield an equally pure $As_2O_3$.

Returning to the suspension of white arsenic produced in the hydrolysis of the arsenious chlorid by a limited amount of water, I usually run this suspension into a wooden tray of suitable dimensions furnished with a porous stoneware or silica filter bottom. Other types of filtering devices, such as filter presses, may be employed; but the apparatus stated is cheap and convenient. With such an apparatus, the mother liquor may be drained off from white arsenic or removed by suction. In making high grades of white arsenic, I ordinarily wash the arsenic somewhat with water. With the described apparatus, the tray may be refilled with fresh water and agitated by blowing air through the porous bottom, after which the white arsenic is once more drained or sucked dry. Washing may be continued to such an extent as is necessary to reduce adhering mother liquor, which may contain soluble impurities, to the desired point, after which the arsenic is dried and forms a merchantable product. The wash waters obtained in so washing may be returned to and used for the hydrolysis of further batches of arsenious chlorid.

In operating in the manner described, not all the arsenic is precipitated; the mother liquor contains a considerable amount of HCl and of arsenic; the amount of retained arsenic being usually 10 or 20 per cent of that contained in the original $AsCl_3$. This acid liquor must be worked up in some manner to remove the contained arsenic. This may be done in an economical manner with the recovery of the arsenic as white arsenic by first nearly completely neutralizing the acidity with calcium carbonate (whiting, chalk, ground limestone, etc.) and then adding slaked lime with vigorous stirring This gives a strong solution of calcium chlorid with a bulky precipitate of calcium arsenite or arsenite of lime, which may be separated and marketed or used as such.

The mother liquor is practically free of arsenic. In a modified method of operation to obtain the white arsenic as such, the precipitate of calcium arsenite is added to a fresh portion of acid mother liquor coming from the original hydrolysis in such proportion as to leave the liquor somewhat acid. The mixture becomes hot by chemical reaction but it may be further heated. The hot clear liquor is decanted or otherwise separated from insoluble matter, such as sand and dirt introduced with the lime and limestone; allowed to cool and separated from the crystallized $As_2O_3$. The arsenic so obtained is white and commercially pure. The mother liquor from the crystals still contains arsenic and may be added to another portion of original mother liquor, treated with limestone and lime, etc. In so operating, substantial amounts of white arsenic may be obtained with cheap reagents and production of waste liquors substantially free of arsenic.

I regard it however as better to convert the arsenic in the mother liquor from hydrolysis into arsenic acid as the operation is simpler and the product of higher price. To this end, I treat the mother liquor with chlorin to oxidize the arsenic acid the contained arsenic existing in arsenious form. Chlorination may be performed in any suitable type of apparatus. The mother liquor readily takes up the chlorin and because of this ready absorption of chlorin, any waste gas containing free chlorin, even if quite dilute as regards the chlorin, may be used for the present purpose. The waste or tail gases from the $AsCl_3$ condensers of a chloridizing apparatus operating in the manner previously described and containing, as they usually do, some free chlorin, are applicable for the present purposes and when so used obviate the necessity for scrubbing such gases. Whatever arsenic they contain is also utilized. Dilute forms of chlorin, such as Deacon chlorin, may be used. It is, of course, also practicable to use pure chlorin, such as commercial liquid chlorin or the anode gases from electrolytic caustic cells.

The chlorinated mother liquor made as described contains HCl and arsenic acid. It can be neutralized in suitable ways to make staple commercial arsenates. The HCl may, for example, be neutralized with lime, the liquor cooled and caustic soda added rapidly with thorough stirring in amount sufficient to release as much calcium as may be desired for combination with the arsenic acid present to form a calcium arsenate. Or the liquid may be partially neutralized with milk of lime in amount sufficient to react with the HCl present, the solution cooled and the necessary additional lime stirred in.

In the described method it will be noted that the entire arsenic content of the arsenious chlorid is recovered partly as commercial white arsenic, or $As_2O_3$, and partly as arsenic acid. Both have large commercial uses. Arsenious oxid is used in the manufacture of arsenites for cattle dips, weed killers, etc., and arsenic acid is largely used in the manufacture of arsenates useful as insecticides. The white arsenic produced in the present process has the advantage of relatively high purity as compared with that directly produced in the usual processes of treating arseniferous ores. Ordinarily arsenious oxid is produced by roasting arsenious ores, such as mispickel, cobalt, arsenids, etc., to produce $As_2O_3$ which passes off as a vapor condensing as a powder in suitable flues or towers ("poison towers"). This powder however is usually much contaminated and, in any event, does not represent all the arsenic in the waste gases; it being necessary, in order to avoid nuisance, to further treat the gases coming from the poison towers with elaborate electrical precipitation means or scrubbing means. These are not very satisfactory in practice. In order to make a good grade of commercial white arsenic, the powder collected as described must be resublimed which is an operation to which many disadvantages attach.

Arsenious chlorid is a body of considerable vapor tension even at low temperatures and where the effluent vapors from the chloridizing apparatus contain any large amount of diluting gases (chlorin, air, etc.) or where cooling conditions in the condenser are not good, the gases passing the condenser may carry substantial amounts of $AsCl_3$. Where the ratio of uncondensed $AsCl_3$ to residual free chlorin is exact, simple scrubbing with water will give a solution of arsenic acid and HCl; but it more often happens that an excess of chlorin is present and if only a limited amount of water is used in scrubbing, this excess passes on and may be used in the described method of oxidizing mother liquors from the formation of white arsenic. In so scrubbing the waste gases from the condenser with a limited amount of water, if scrubbing liquid be kept hot, a strong solution of arsenic acid is obtained substantially free of HCl, as described and claimed in a copending application. The HCl passes forward in a gaseous form. It may be removed from the effluent gases by scrubbing. Or, as stated, the uncondensed vapors and gases coming from the condensers may be used, thereby utilizing both the contained arsenious chlorid and free chlorin.

What I claim is:—

1. In the recovery of arsenic from ores and speisses by chlorination thereof, the process of utilizing produced arsenious chlorid which comprises admixing such chlorid with a limited amount of water, removing solid $As_2O_3$ produced by hydrolysis, chlorinating the mother liquor to produce arsenic acid therein and neutralizing the liquid to produce arsenates.

2. In the recovery of arsenic from ores and speisses by chlorination thereof to produce arsenious chlorid, the process which comprises chlorinating such a material by treatment with chlorin in such a manner as to form fixed chlorids and vapors containing arsenic trichlorid, cooling such vapors sufficiently to deposit ferric chlorid, condensing residual vapors to condense arsenious chlorid, admixing such chlorid with 2 to 8 parts of water to produce an acid solution and collecting and removing separated white arsenic.

3. In the recovery of arsenic from ores and speisses by chlorination thereof to produce arsenious chlorid, the process which comprises admixing such chlorid with water in about the ratio of 100 parts by weight of such chlorid to 340 parts of water and collecting separated white arsenic.

4. In the utilization of materials containing arsenious chlorid, the process which comprises mixing such material with an amount of water not less than twice its weight and not more than eight times its weight to produce an acid solution and collecting and purifying the separated white arsenic.

5. In the recovery of arsenic in commercial forms from arsenid material containing the same the process which comprises chlorinating such material with an excess of chlorin to form hot vapors containing arsenious chlorid, somewhat cooling said vapors to separate any ferric chlorid formed by iron in the original material, further cooling said vapors to condense liquid arsenious chlorid therefrom, hydrolyzing arsenious chlorid so produced with a limited amount of water to produce white arsenic and an arseniferous mother liquor and chlorinating said arseniferous mother liquor with the aid of effluent waste gases containing free chlorin coming from the operation.

6. In the recovery of arsenic in commercial forms from arsenid material containing the same the process which comprises chlorinating such material with an excess of chlorin to form hot vapors containing arsenious chlorid, somewhat cooling said vapors to separate any ferric chlorid formed by iron in the original material, further cooling said vapors to condense liquid arsenious chlorid therefrom, hydrolyzing arsenious chlorid so produced with a limited amount of water to produce white arsenic and an arseniferous mother liquor and chlorinating said arseniferous mother liquor with the aid of effluent waste gases containing free chlorin and uncondensed arsenious chlorid coming from the operation.

7. In the removal of arsenic from ores and speisses the process of recovering such arsenic in commercial forms which comprises chlorinating the material with an excess of free chlorin to produce hot vapors containing arsenious chlorid, cooling the vapors to condense arsenious chlorid and separate the same from noncondensable chlorin-containing gases, hydrolyzing the arsenious chlorid with a limited amount of water to produce white arsenic and an arseniferous mother liquor, separating the white arsenic and also any liquid sulfur chlorid formed and chorinating the mother liquor to produce arsenic acid with the aid of said gases.

8. In the treatment of arsenid ores and speisses containing sulfur, the process which comprises chlorinating such an ore to produce vapors containing arsenious chlorid, somewhat cooling said vapors to deposit iron chlorid, further cooling the vapors to deposit arsenious chlorid, heating said chlorid with arsenic trioxid to decompose sulfur chlorid and hydrolyzing the purified chlorid with a limited amount of water to produce arsenic trioxid and an arseniferous mother liquor.

9. In the treating of arsenid ores and speisses containing sulfur, the process which comprises chlorinating such an ore to produce vapors containing arsenious chlorid, somewhat cooling said vapors to deposit iron chlorid, further cooling the vapors to deposit arsenious chlorid, heating said chlorid with arsenic trioxid to decompose sulfur chlorid and hydrolyzing the purified chlorid with a limited amount of water to produce arsenic trioxid and an arseniferous mother liquor, separating the arsenic trioxid and chlorinating the mother liquor.

10. In the treatment of arsenious chlorid, the process which comprises hydrolyzing the same with the water in about the proportion to give a precipitate of $As_2O_3$ and a mother liquor containing 15 to 20 per cent of $HCl$ and recovering arsenic from the mother liquor.

In testimony whereof, I affix my signature in the presence of two subscribing witnesses.

ERNEST W. WESCOTT.

Witnesses:
JOHN J. MALONEY,
FRANCES E. WILLIAMSON.